United States Patent
Thiebaut et al.

(10) Patent No.: US 12,538,200 B2
(45) Date of Patent: Jan. 27, 2026

(54) COMMUNICATION SYSTEM WITH VIRTUAL NETWORK MAPPING

(71) Applicant: NOKIA TECHNOLOGIES OY, Espoo (FI)

(72) Inventors: Laurent Thiebaut, Antony (FR); Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 394 days.

(21) Appl. No.: 17/917,372

(22) PCT Filed: Apr. 6, 2020

(86) PCT No.: PCT/EP2020/059708
§ 371 (c)(1),
(2) Date: Oct. 6, 2022

(87) PCT Pub. No.: WO2021/204343
PCT Pub. Date: Oct. 14, 2021

(65) Prior Publication Data
US 2023/0180085 A1 Jun. 8, 2023

(51) Int. Cl.
*H04W 36/14* (2009.01)
*H04W 36/00* (2009.01)

(52) U.S. Cl.
CPC ....... *H04W 36/14* (2013.01); *H04W 36/0016* (2013.01); *H04W 36/13* (2023.05)

(58) Field of Classification Search
CPC . H04W 36/14; H04W 36/0016; H04W 36/13; H04W 36/142; H04W 36/144; H04W 36/1443; H04W 36/1446; H04L 41/0813; H04L 41/40; H04L 41/5041
See application file for complete search history.

(56) References Cited

U.S. PATENT DOCUMENTS

| | | | |
|---|---|---|---|
| 2019/0174320 A1* | 6/2019 | Kodaypak | ............... H04L 41/00 |
| 2020/0022033 A1* | 1/2020 | Wei | ................... H04W 36/0064 |
| 2020/0022061 A1 | 1/2020 | Jin et al. | |

(Continued)

FOREIGN PATENT DOCUMENTS

| | | |
|---|---|---|
| EP | 3 537 768 A1 | 9/2019 |
| WO | 2018/135992 A1 | 7/2018 |

OTHER PUBLICATIONS

International Search Report and Written Opinion dated Feb. 8, 2021 corresponding to International Patent Application No. PCT/EP2020/059708.

(Continued)

*Primary Examiner* — Ji-Hae Yea
(74) *Attorney, Agent, or Firm* — SQUIRE PATTON BOGGS (US) LLP

(57) ABSTRACT

There is provided a network apparatus comprising: means for storing a mapping, the mapping comprising an indication of a first virtual network and at least one other virtual network configured to provide a service at a lower quality than the first virtual network; means for receiving, from another network apparatus, a request to provide a service using the first virtual network; and means for using the mapping and the indication of the first virtual network to select a virtual network to provide the requested service.

20 Claims, 11 Drawing Sheets

(56) References Cited

U.S. PATENT DOCUMENTS

2022/0417842 A1* 12/2022 Yang .................... H04W 24/10

OTHER PUBLICATIONS

3GPP TR 21.905 V16.0.0 (Jun. 2019), Technical Report, 3rd Generation Partnership Project; Technical Specification Group Services and System Aspects; Vocabulary for 3GPP Specifications (Release 16), Jun. 2019.
3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020.
3GPP TS 38.300 V16.0.0 (Dec. 2019), Technical Specification, 3rd Generation Partnership Project; Technical Specification Group Radio Access Network; NR; NR and NG-RAN Overall Description; Stage 2 (Release 16), Dec. 2019.

* cited by examiner

COMMUNICATION SYSTEM WITH VIRTUAL NETWORK MAPPING

FIELD

The present application relates to a method, apparatus, and computer program involved in supporting Virtual networks.

BACKGROUND

A communication system can be seen as a facility that enables communication sessions between two or more entities such as user terminals, base stations/access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided a network apparatus comprising: means for storing a mapping, the mapping comprising an indication of a first virtual network and at least one other virtual network configured to provide a service at a lower quality than the first virtual network; means for receiving, from another network apparatus, a request to provide a service using the first virtual network; and means for using the mapping and the indication of the first virtual network to select a virtual network to provide the requested service.

The another network apparatus may comprise means for operating as a core network processing function.

The another network apparatus may comprise means for operating as a radio access network access point.

The network apparatus may further comprise means for transmitting to a core network processing function an indication of the selected virtual network.

The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The means for using may comprise means for selecting a virtual network that corresponds to the highest level of service provision provided by the network apparatus within said mapping.

The network apparatus may further comprise means for operating as a radio access network access point The request may further comprise an indication of a second virtual network that currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a second aspect, there is provided a network apparatus comprising: means for storing a mapping, the mapping comprising an indication of a first virtual network and at least one other virtual network configured to provide a service at a lower quality than the first virtual network; and means for transmitting, to another network apparatus, a request to provide a service using a first virtual network.

The network apparatus may further comprise means for operating as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a third aspect, there is provided a core network apparatus comprising: means for receiving, from another network apparatus, an indication that the another network apparatus will provide a service using a second virtual network, and an indication that the service is preferably provided using a first virtual network; and means for providing the received indication to a network apparatus comprising means for operating as a core network processing function.

The request may be a handover request.

The request may comprise a protocol data unit session setup request message and/or an Initial Context Setup Request message.

A virtual network may correspond to a network slice.

The core network apparatus may further comprise means for transmitting, prior to receiving the indication, to a radio access network apparatus, a request to provide the service using the first virtual network.

According to a fourth aspect, there is provided a core network apparatus, comprising: means for receiving an indication that a service is delivered using a second virtual network while the service should be preferably provided using a first virtual network; and means for determining and transferring new policies to deliver the service A virtual network may correspond to a network slice.

According to a fifth aspect, there is provided a core network apparatus, comprising: means for receiving an indication that a service is delivered using a second virtual network while the service should be preferably provided using a first virtual network; and means for storing the information for generating charging information.

The information may be stored in a Charging Record.

A virtual network may correspond to a network slice.

According to a sixth aspect, there is provided a core network apparatus comprising: means for storing a mapping, the mapping comprising an indication of a first virtual network and at least one other virtual network configured to provide a service at a lower quality than the first virtual network; means for determining at least two network apparatuses supporting different sets of virtual networks, wherein each set comprises at least one virtual network indicated within said mapping; and means for using the mapping and the determined at least two network apparatuses to define an area within which a terminal receiving the service is likely to be found. The defined area may be a tracking area of the terminal or a registration area of the terminal.

A virtual network may correspond to a network slice.

According to a seventh aspect, there is provided method for a network apparatus, the method comprising: storing a mapping, the mapping comprising an indication of a first virtual network and at least one other virtual network configured to provide a service at a lower quality than the first virtual network; receiving, from another network apparatus, a request to provide a service using the first virtual network; and using the mapping and the indication of the first virtual network to select a virtual network to provide the requested service.

The another network apparatus may be operating as a core network processing function.

The another network apparatus may be operating as a radio access network access point The method may further comprise transmitting to a core network processing function an indication of the selected virtual network.

The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The using may comprise selecting a virtual network that corresponds to the highest level of service provision provided by the network apparatus within said mapping.

The network apparatus may be operating as a radio access network access point

The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to an eighth aspect, there is provided a method for a network apparatus, the method comprising: storing a mapping, the mapping comprising an indication of a first virtual network and at least one other virtual network configured to provide a service at a lower quality than the first virtual network; and transmitting, to another network apparatus, a request to provide a service using a first virtual network.

The network apparatus may be operating as a radio access network access point

The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a ninth aspect, there is provided a method for a core network apparatus, the method comprising: receiving, from another network apparatus, an indication that the another network apparatus will provide a service using a second virtual network, and an indication that the service is preferably provided using a first virtual network; and providing the received indication to a network apparatus operating as a core network processing function.

The request may be a handover request.

The request may comprise a protocol data unit session setup request message and/or an Initial Context Setup Request message.

A virtual network may correspond to a network slice.

The method may further comprise transmitting, prior to receiving the indication, to a radio access network apparatus, a request to provide the service using the first virtual network.

According to a tenth aspect, there is provided a method for a core network apparatus, the method comprising: receiving an indication that a service is delivered using a second virtual network while the service should be preferably provided using a first virtual network; and determining and transferring new policies to deliver the service A virtual network may correspond to a network slice.

According to an eleventh aspect, there is provided a method for a core network apparatus, the method comprising: receiving an indication that a service is delivered using a second virtual network while the service should be preferably provided using a first virtual network; and storing the information for generating charging information.

The information may be stored in a Charging Record.

A virtual network may correspond to a network slice.

According to a twelfth aspect, there is provided a method for a core network apparatus comprising: storing a mapping, the mapping comprising an indication of a first virtual network and at least one other virtual network configured to provide a service at a lower quality than the first virtual network; determining at least two network apparatuses supporting different sets of virtual networks, wherein each set comprises at least one virtual network indicated within said mapping; and using the mapping and the determined at least two network apparatuses to define an area within which a terminal receiving the service is likely to be found. The defined area may be a tracking area of the terminal or a registration area of the terminal.

A virtual network may correspond to a network slice.

According to a thirteenth aspect, there is provided a network apparatus comprising at least one processor, and at least one memory comprising computer code that, when executed by the at least one processor, causes the network apparatus to: store a mapping, the mapping comprising an indication of a first virtual network and at least one other virtual network configured to provide a service at a lower quality than the first virtual network; receive, from another network apparatus, a request to provide a service using the first virtual network; and use the mapping and the indication of the first virtual network to select a virtual network to provide the requested service.

The another network apparatus may further be caused to operate as a core network processing function.

The another network apparatus may be further caused to operate as a radio access network access point The network apparatus may further be caused to transmit to a core network processing function an indication of the selected virtual network.

The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The using may comprise selecting a virtual network that corresponds to the highest level of service provision provided by the network apparatus within said mapping.

The network apparatus may further be caused to operate as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a fourteenth aspect, there is provided a network apparatus comprising at least one processor, and at least one memory comprising computer code that, when executed by the at least one processor, causes the network apparatus to: store a mapping, the mapping comprising an indication of a first virtual network and at least one other virtual network configured to provide a service at a lower quality than the first virtual network; and transmit, to another network apparatus, a request to provide a service using a first virtual network.

The network apparatus may further be caused to operate as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a fifteenth aspect, there is provided a core network apparatus comprising at least one processor, and at least one memory comprising computer code that, when executed by the at least one processor, causes the core network apparatus to: receive, from another network apparatus, an indication that the another network apparatus will provide a service using a second virtual network, and an indication that the service is preferably provided using a first virtual network; and provide the received indication to a network apparatus operating as a core network processing function.

The request may be a handover request.

The request may comprise a protocol data unit session setup request message and/or an Initial Context Setup Request message.

A virtual network may correspond to a network slice.

The core network apparatus may further be caused to transmit, prior to receiving the indication, to a radio access network apparatus, a request to provide the service using the first virtual network.

According to a sixteenth aspect, there is provided a core network apparatus, comprising at least one processor, and at least one memory comprising computer code that, when executed by the at least one processor, causes the core network apparatus to: receive an indication that a service is delivered using a second virtual network while the service should be preferably provided using a first virtual network; and determine and transfer new policies to deliver the service A virtual network may correspond to a network slice.

According to a seventeenth aspect, there is provided a core network apparatus, comprising at least one processor, and at least one memory comprising computer code that, when executed by the at least one processor, causes the core network apparatus to: receive an indication that a service is delivered using a second virtual network while the service should be preferably provided using a first virtual network; and store the information for generating charging information.

The information may be stored in a Charging Record.

A virtual network may correspond to a network slice.

According to an eighteenth aspect, there is provided a core network apparatus comprising at least one processor, and at least one memory comprising computer code that, when executed by the at least one processor, causes the core network apparatus to: store a mapping, the mapping comprising an indication of a first virtual network and at least one other virtual network configured to provide a service at a lower quality than the first virtual network; determine at least two network apparatuses supporting different sets of virtual networks, wherein each set comprises at least one virtual network indicated within said mapping; and use the mapping and the determined at least two network apparatuses to define an area within which a terminal receiving the service is likely to be found. The defined area may be a tracking area of the terminal or a registration area of the terminal.

A virtual network may correspond to a network slice.

According to a nineteenth aspect, there is provided a network apparatus comprising: storing circuitry for storing a mapping, the mapping comprising an indication of a first virtual network and at least one other virtual network configured to provide a service at a lower quality than the first virtual network; receiving circuitry for receiving, from another network apparatus, a request to provide a service using the first virtual network; and using circuitry for using the mapping and the indication of the first virtual network to select a virtual network to provide the requested service.

The another network apparatus may comprise operating circuitry for operating as a core network processing function.

The another network apparatus may comprise operating circuitry for operating as a radio access network access point The network apparatus may further comprise transmitting circuitry for transmitting to a core network processing function an indication of the selected virtual network.

The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The using circuitry may comprise selecting circuitry for selecting a virtual network that corresponds to the highest level of service provision provided by the network apparatus within said mapping.

The network apparatus may further comprise operating circuitry for operating as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a twentieth aspect, there is provided a network apparatus comprising: storing circuitry for storing a mapping, the mapping comprising an indication of a first virtual network and at least one other virtual network configured to provide a service at a lower quality than the first virtual network; and transmitting circuitry for transmitting, to another network apparatus, a request to provide a service using a first virtual network.

The network apparatus may further comprise operating circuitry for operating as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a twenty first aspect, there is provided a core network apparatus comprising: receiving circuitry for receiving, from another network apparatus, an indication that the another network apparatus will provide a service using a second virtual network, and an indication that the service is preferably provided using a first virtual network; and providing circuitry for providing the received indication to a network apparatus operating as a core network processing function.

The request may be a handover request.

The request may comprise a protocol data unit session setup request message and/or an Initial Context Setup Request message.

A virtual network may correspond to a network slice.

The core network apparatus may further comprise transmitting circuitry for transmitting, prior to receiving the indication, to a radio access network apparatus, a request to provide the service using the first virtual network.

According to a twenty second aspect, there is provided a core network apparatus, comprising: receiving circuitry for receiving an indication that a service is delivered using a second virtual network while the service should be preferably provided using a first virtual network; and determining circuitry for determining and transferring new policies to deliver the service A virtual network may correspond to a network slice.

According to a twenty third aspect, there is provided a core network apparatus, comprising: receiving circuitry for receiving an indication that a service is delivered using a second virtual network while the service should be preferably provided using a first virtual network; and storing circuitry for storing the information for generating charging information.

The information may be stored in a Charging Record.

A virtual network may correspond to a network slice.

According to a twenty fourth aspect, there is provided a core network apparatus comprising: storing circuitry for storing a mapping, the mapping comprising an indication of a first virtual network and at least one other virtual network configured to provide a service at a lower quality than the first virtual network; determining circuitry for determining at least two network apparatuses supporting different sets of virtual networks, wherein each set comprises at least one virtual network indicated within said mapping; and using circuitry for using the mapping and the determined at least two network apparatuses to define an area within which a terminal receiving the service is likely to be found. The defined area may be a tracking area of the terminal or a registration area of the terminal.

A virtual network may correspond to a network slice.

According to a twenty fifth aspect, there is provided non-transitory computer readable medium comprising program instructions for causing an apparatus to perform at least the following: store a mapping, the mapping comprising an indication of a first virtual network and at least one other virtual network configured to provide a service at a lower quality than the first virtual network; receive, from another network apparatus, a request to provide a service using the first virtual network; and use the mapping and the indication of the first virtual network to select a virtual network to provide the requested service.

The another network apparatus may further be caused to operate as a core network processing function.

The another network apparatus may be further caused to operate as a radio access network access point The network apparatus may further be caused to transmit to a core network processing function an indication of the selected virtual network.

The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The using may comprise selecting a virtual network that corresponds to the highest level of service provision provided by the network apparatus within said mapping.

The network apparatus may further be caused to operate as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a twenty sixth aspect, there is provided non-transitory computer readable medium comprising program instructions for causing an apparatus to perform at least the following: store a mapping, the mapping comprising an indication of a first virtual network and at least one other virtual network configured to provide a service at a lower quality than the first virtual network; and transmit, to another network apparatus, a request to provide a service using a first virtual network.

The network apparatus may further be caused to operate as a radio access network access point The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

According to a twenty seventh aspect, there is provided non-transitory computer readable medium comprising program instructions for causing an apparatus to perform at least the following: receive, from another network apparatus, an indication that the another network apparatus will provide a service using a second virtual network, and an indication that the service is preferably provided using a first virtual network; and provide the received indication to a network apparatus operating as a core network processing function.

The request may be a handover request.

The request may comprise a protocol data unit session setup request message and/or an Initial Context Setup Request message.

A virtual network may correspond to a network slice.

The core network apparatus may further be caused to transmit, prior to receiving the indication, to a radio access network apparatus, a request to provide the service using the first virtual network.

According to a twenty eighth aspect, there is provided non-transitory computer readable medium comprising program instructions for causing an apparatus to perform at least the following: receive an indication that a service is delivered using a second virtual network while the service should be preferably provided using a first virtual network; and determine and transfer new policies to deliver the service A virtual network may correspond to a network slice.

According to a twenty ninth aspect, there is provided non-transitory computer readable medium comprising program instructions for causing an apparatus to perform at least the following: receive an indication that a service is delivered using a second virtual network while the service should be preferably provided using a first virtual network; and store the information for generating charging information.

The information may be stored in a Charging Record.

A virtual network may correspond to a network slice.

According to an thirtieth aspect, there is provided non-transitory computer readable medium comprising program instructions for causing an apparatus to perform at least the following: store a mapping, the mapping comprising an indication of a first virtual network and at least one other virtual network configured to provide a service at a lower quality than the first virtual network; determine at least two network apparatuses supporting different sets of virtual networks, wherein each set comprises at least one virtual network indicated within said mapping; and use the mapping and the determined at least two network apparatuses to define an area within which a terminal receiving the service is likely to be found. The defined area may be a tracking area of the terminal or a registration area of the terminal.

A virtual network may correspond to a network slice.

According to a thirty first aspect, there is provided a computer program comprising program instructions for causing a computer to perform any method as described above.

According to a thirty second aspect, there is provided a computer program product stored on a medium may cause an apparatus to perform any method as described herein.

According to a thirty third aspect, there is provided an electronic device that may comprise apparatus as described herein.

According to a thirty fourth aspect, there is provided a chipset that may comprise an apparatus as described herein.

DESCRIPTION OF FIGURES

Examples will now be described, by way of example only, with reference to the accompanying Figures in which.

DETAILED DESCRIPTION

In general, the following disclosure relates to how to ensure a service can continue when a desired quality level isn't available.

In particular, the following disclosure relates when services are provided utilising virtual/logical networks (also referred to as slices herein). As will be discussed in the following, a network apparatus is provided with a mapping between a first virtual network and at least one other virtual network. The first virtual network may be a target virtual network, which is a virtual network for effecting that service that is preferred by at least one entity in the network. The at least one other virtual network is configured such it would provide a service at a lower quality than the first virtual network would provide the service at. When the network apparatus then receives a request to provide the service using the first virtual network (or at a quality level provided by the first virtual network), the network apparatus may use the mapping and the request identifying the first virtual network to select a virtual network to provide the service. When the first virtual network is available, the first virtual network is selected. When the first virtual network is not available, the network apparatus selects a virtual network from the mapping that would provide the best service/quality level.

The information of the target virtual network to deliver the service (i.e. the first virtual network) may also be stored and propagated to other network apparatuses that will later support the service in order to try to deliver the service using the target virtual network when possible. The information on the selected virtual network is also propagated to charging and policy control functions in order to be taken into account by charging and policy decisions.

The following disclosure further explores how such a mapping may be used by core network processing functions during registration of a user equipment/terminal to define an area within which the user equipment is expected to be found by paging, e.g. to define a Registration Area. The following disclosure further explores how such a mapping may be used to facilitate charging updates in the core network.

Further features of this are discussed below in examples.

Before explaining in detail the examples, certain general principles of a wireless communication system and mobile communication devices are briefly explained with reference to FIGS. 1 to 2 to assist in understanding the technology underlying the described examples.

Figure 1:
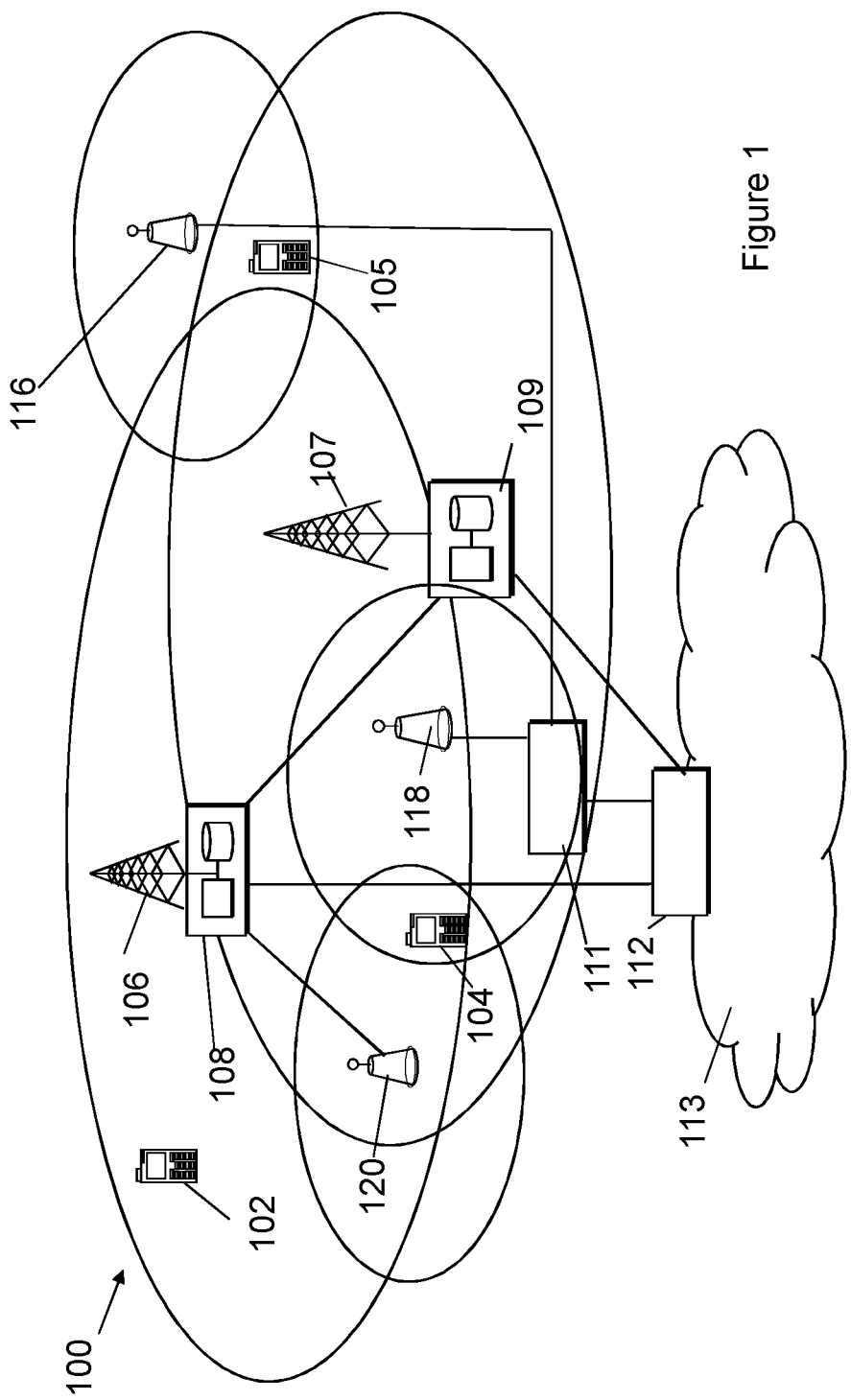
FIG. 1 shows a schematic diagram of an example communication system comprising a plurality of base stations and a plurality of communication devices.

In a wireless communication system 100, such as that shown in FIG. 1, mobile communication devices, user apparatus, or terminal 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. It is understood that the term "terminal" is used to cover communication devices that may access a network through an access node, and which may or may not have a user. Examples of such terminals without a user include devices that make machine-to-machine transmissions in a factory. A communication device is provided with an appropriate signal receiving and transmitting apparatus for enabling communications, for example enabling access to a communication network or communications directly with other users. The communication device may access a carrier provided by a station or access node, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. The LTE standard is developed by the 3rd Generation Partnership Project (3GPP). LTE was first released in 2008 (known as LTE Release 8), and new enhancements (in form of releases) has been introduced since then. LTE Release 13 and onwards is also known as LTE Advanced Pro. Another example of communications system is 5G system and New Radio (NR) radio interface, which is the latest 3GPP development.

A base station is referred to as an eNodeB (eNB) in LTE and as a gNodeB (gNB) in New Radio, and may be referred to more generally as simply a network apparatus or a network access node. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

3GPP systems may however be considered to have a so-called "flat" architecture, without the provision of RNCs; rather the (e)/(g)NB is in communication with a system architecture evolution gateway (SAE-GW) and a mobility management entity (MME), which entities may also be pooled meaning that a plurality of these nodes may serve a plurality (set) of (e)/(g)NBs. Each user apparatus is served by only one MME and/or S-GW at a time and the (e)/(g)NB keeps track of current association. SAE-GW is a "high-level" user plane core network element in LTE, which may comprise the S-GW and the P-GW (serving gateway and packet data network gateway, respectively). The functionalities of the S-GW and P-GW are separated, and they are not required to be co-located. For 5G systems, in the 5G core the above-mentioned network entities are denoted User Plane Function (UPF) and Access and Mobility Management Function (AMF). The UPF is in charge of the user plane connectivity in the core and the AMF is in charge of access-related control plane functions in the core.

In a 3GPP system, radio resource control (RRC) is defined to be a sublayer of radio interface Layer 3 that exists in the control plane only, and which provides information transfer service to the non-access stratum (an example is provided in 3GPP Technical Specification Group Services and System Aspects 21.905). RRC is a protocol layer between a user apparatus and a base station, and is in charge of, for example, paging the user apparatus when traffic comes, establishing/maintaining or release of radio links (establishing an RRC connection between user apparatus and (e)/(g) NB), user apparatus mobility, user apparatus measurement configuration and user apparatus reporting configuration, etc. RRC is also responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some examples, the smaller stations may not be provided. It is understood that this is just an example communication system, and other network structures may be defined by an operating communication protocol. While the description above relates to 3GPP radio technology, the access network considered in this disclosure may correspond to other technologies such as wireline (for example Digital Subscriber Line or Passive Optical Network access) or Ethernet/WiFi technologies used to reach a 3GPP based Core network such as the 5G Core network.

Figure 2:
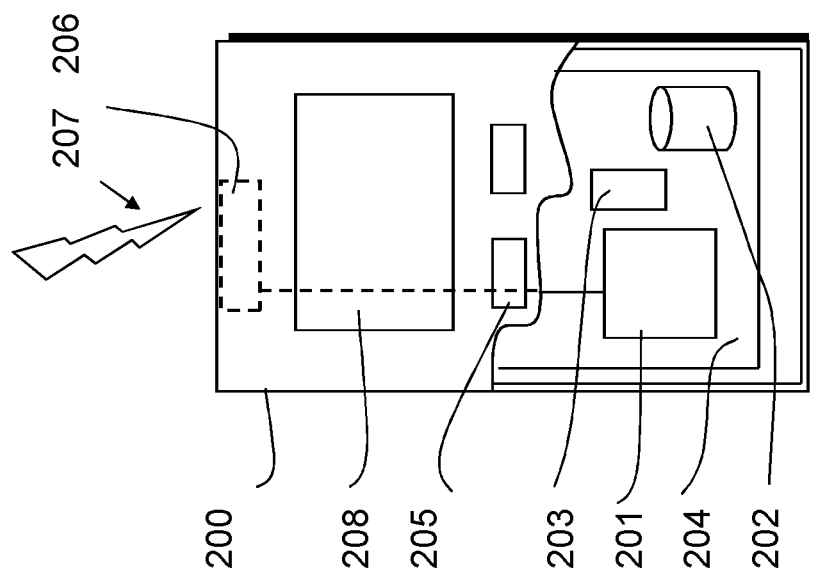
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment, apparatus or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. Other non-limiting examples include apparatuses that may be used for Industrial Internet of things applications, such as, for example, smart robotics, assembly devices, warehouse-based devices, intelligent logistics, etc. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information. It is understood that although a "mobile" communication device is referred to in the above and in the following, that the communication device may be stationary for extended periods of time.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the 5th Generation (5G) New Radio (NR). Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
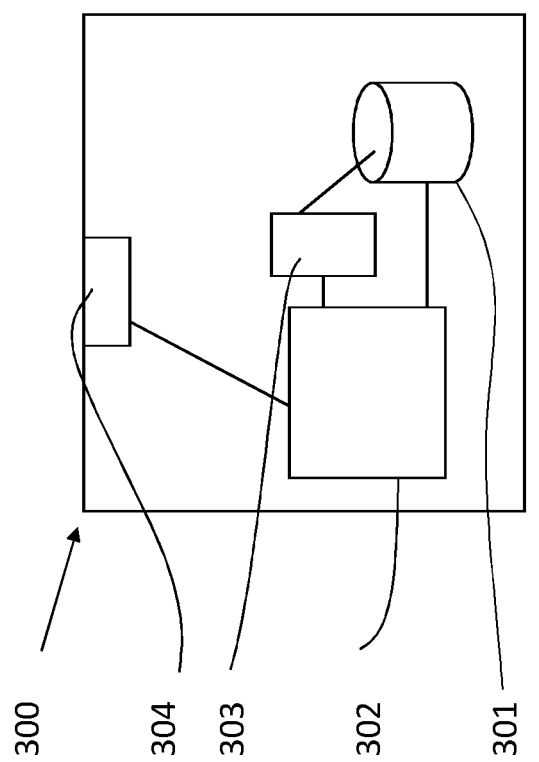
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a radio access network access point, e.g. a base station or (g) node B, or a node of a core network such as an MME or Access and Mobility Management Function (AMF). The method may be implanted in a single control apparatus or across more than one control apparatus. The control apparatus may be integrated with or external to a node or module of a core network or radio access network. In some examples, base stations comprise a separate control apparatus unit or module. In other examples, the control apparatus can be another network element such as a radio network controller or a spectrum controller. In some examples, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as a gNB.

It is understood that although the example network element is shown as a single apparatus, that the functions of the network element may be split amongst several distinct apparatuses.

Some 3GPP specifications also allow for network slicing. Network slicing is a type of virtual networking architecture that allows the creation of multiple virtual networks on top of a shared physical infrastructure. For example, core network control plane parts user plane network function parts and access network parts of a network may be kept separate. This would enable user plane functionality to be deployed closer to an edge of a communication network (such as in access points), while management functions for the network may remain in the core network architecture. The virtual/logical networks are referred to as network slices.

Network slices may also be configured for specific use cases. For example, there may be an Internet of Things slice, a mobile broadband slice and a healthcare slice all operating the same network infrastructure. Each slice may serve a particular service type with an agreed service level agreement (SLA), providing respective quality/service levels according to their SLA. Therefore, network slices may be thought of an end-to-end logical network running on a common underlying network (virtual or physical) that are mutually isolated with independent control and management functions.

Network slicing was introduced and described for 3GPP in Release 15 in TS 23.501 Section 5.15. In this description, the 5G core network sends a configured Network Slice Selection Assistance Information (NSSAI) to a user equipment during an Attach procedure for that user equipment. Currently. an NSSAI comprises at least one, but no more than eight, Single-Network Slice Selection Assistance Information (S-NSSAI). Thereafter, whenever the user equipment performs a Registration Area update, the user equipment can indicate a requested NSSAI. An Access and Mobility Function (AMF) in the 5G core network takes this requested NSSAI into account together with subscribed NSSAI to infer an allowed NSSAI for the user equipment. This allowed NSSAI may be sent back to the user equipment. The allowed NSSAI represents the list of S-NSSAI(s)

that the AMF has allowed the user equipment to use for further requests taking place in this Registration Area.

As a user equipment/terminal may access multiple services, a user equipment may access multiple slices over the same network using the S-NSSAI(s) indicated in the allowed NSSAI. As a result of this, the network and user equipment may be provided with a capability to distinguish between different slices/S-NSSAIs.

To distinguish between different slices, each S-NSSAI may comprise information on a Slice/Service type, which defines an expected network behaviour in terms of features and services for a particular slice. Optionally, an S-NSSAI may comprise slice differentiation information. Slice differentiation information may be used to differentiate between multiple service slices of the same Slice/Service Type.

With a user equipment using a particular slice for provision of a service, a problem may arise during handover when a target access point does not support the same set of slices as a source access point.

For example, considering the case of a protocol data unit (PDU) Session being associated with a single S-NSSAI, this means that a PDU session resource of Slice A running at a source NG-radio access network access point will be released at a target NG-radio access network access point if the target NG-radio access network access point doesn't support Slice A. Consequently, if the service is to be re-started after the handover, then a new PDU session would be started that would be mapped to another slice (Slice B) supported by the target NG-radio access network access point. Such a handover would result in an interruption in service while the new PDU session is configured.

The present application seeks to address at least some of the above-mentioned issues.

In examples of the following, there is provided a network access apparatus that is configured to store a mapping between multiple slices. This mapping is used during handover from a source network access apparatus to a target network access apparatus. In particular, the source network access apparatus may provide to the target network access apparatus an indication of a slice for providing a service to a user equipment that is preferred for that service (i.e. a target slice). An indication of a slice currently used by the source network access apparatus to provide the service to the user equipment may also be provided. The target network access apparatus may use the preferred slice information and the stored mapping to determine if the target network can provide a service to the user equipment using either the preferred slice or another mapped slice.

This determination may be positive when the target access network apparatus determines that it supports any of the preferred slice and a slice that is mapped to the preferred slice in the stored mapping. When the determination is positive, the target network access apparatus accepts to handover this service with the preferred slice or the mapped slice.

This determination may be negative when the target network access apparatus determines that it does not support any of the preferred slice and a slice that is mapped to the preferred slice in the stored mapping. When the determination is negative, the PDU session may need to be re-established.

The mapped slice may be considered as a "degraded" slice compared to the preferred slice. In other words, the mapped slice may provide a lower service quality than the preferred slice.

Current 5G specifications define slices with reference to S-NSSAI but, for ease of explanation, numbers will be used instead of S-NSSAI as slice identifiers. For example, Slice 10 is for ultra-reliable-low-latency communications (URLLC) and has a higher quality level than the defined slice 11. Therefore, slice 11 may be considered to be a degraded slice compared to slice 10.

It is understood that when a slice in the mapping providing a lower quality is being used to provide a service and a slice within the mapping providing a higher quality becomes available, the network apparatus may use the mapping information to remap the provided service onto the higher quality slice. In other words, the service may be upgraded during operation to a slice providing a better service level. This may be the result of a handover to a target access network apparatus that supports the higher quality slice (i.e. the target slice) from a source network access apparatus that does not support this higher quality slice. This may be the result of the capabilities of a network access apparatus being expanded during operation such that the higher quality slice becomes available. This may be the result of a handover to a target radio cell that supports the higher quality slice from a source network cell that does not support the higher quality slice, both cells being served by the same access network apparatus.

The above described mechanisms maybe applied in a variety of circumstances. For example, this may be used for Xn handover but also for NG handover, The Xn interface and NG Handover procedures are currently defined in 3GPP TS 23.502 in Section 5.9.1.

As another example, the presently described mechanisms may be applied to protocol data unit (PDU) session setup. In this case, a requested/preferred/target slice of a higher quality (e.g. slice 10) may be remapped to slice 11. A later PDU session upgrade from slice 11 to slice 10 may happen autonomously, for example if slice 11 becomes available during an handover to another access network node.

These two use cases will be considered in the following using terminology consistent with current 5G standards. Xn handover will be used to illustrate the first example. However, it is understood that this is intended to be illustrative, and the present disclosure is not limited to such networks.

To simplify the following discussion, the present examples will refer to a preferred/requested/target slice as "slice 10" or "slice x", and to lower quality slices as "slice y", "slice 11", "slice 12" and/or "slice 13". Slices with higher numbers will be assumed in the following to provide lower service levels than slices with lower numbers. As per the above discussion, the term slice/virtual network will refer to an 5-NSSAI that is mapped to a set of parameters (where the set is greater than one).

The following will also consider that slice remapping (e.g. using a lower quality slice when a higher quality slice isn't available, provided that lower quality slice is comprised within the same mapping) relates to changing the service level provided wholly at the radio access network (RAN) side, and not in the core network. Therefore, the presently described systems do not change the service level in the core network part, and so has minimal impact to the core part of the slice. It is understood that various core network elements may be notified of the use of a different slice. This notification may be used by the core network to change charging parameters for the subscriber of the user equipment to reflect the lower quality of service being provided in the RAN. This information may also be used for policy control to determine new policies to serve the user plane traffic.

It is also understood that slice remapping in the following may result from a decision by the operator that services provided on slice x may be supported in a degraded mode by slice y. The operator may inform core network elements of such a decision.

Based on the above, a slice x may be comprised within a remapping list along with the list of slices onto which slice x can be remapped (according to an operator/core network element). It is assumed that any apparatus supporting slice x also supports the slices contained in the slice remapping list of slice x, as they are of the same or lower quality than slice x. For example, if slice 10 remaps to degraded slice 11 then to further degraded 12, then the slice 10 remapping list will include slice 11 and slice 12, and it is assumed that any apparatus supporting slice 10 also supports slice 11 and slice 12, and that any apparatus supporting slice 11 also supports slice 12. Such remapping lists may be comprised within a data structure such as a table.

With the remapping lists stored, when there comes a point in time when a radio access network node cannot support a service on a target slice x, the radio access network node may instead support that service on another slice in the same slice remapping list.

Elements of the radio access network may therefore keep track of the target slice. The target slice may be indicated by the core network. The target slice may be indicated by a user equipment during a service request. A radio access network access node will then attempt to serve the user equipment requested service with a slice that is in the slice remapping list of the target slice, using the best quality slice available to the radio access network access node that's in the remapping list up to the level of the target slice.

The radio access network node may notify the core network of when there is such a change of the slice used/selected by the radio access network node to serve the user equipment requested service. As discussed above, this information may be used by the core network for policy control and charging.

The following will consider example operations of various core network processing entities in light of the present disclosure before considering example operations of the radio access network nodes. The following will also provide examples using terminology consistent with 5G communication protocols and standards. However, it is understood that the present disclosure is not limited to such a network.

The 5G core network comprises a plurality of different processing entities that are referred to as functions.

Within the 5G core network, there is an interface (the "N7" interface) between a Session Management Function (SMF) and a Policy Control Function (PCF). There is also an interface (the "N40" interface) between the SMF and the Charging Function (CHF). Both of these interfaces may be upgraded to support receiving a notification from the SMF of the current slice being used for a PDU session. The CHF may be configured to store details of an actual slice level used in a Charging Detailed Record or to use them for service rating e.g. for online charging purposes. The PCF may use information on the current slice to associate a different set of Charging Keys to the PDU Session.

The mapping lists and information may also be used by at least one element of a core network when defining a Registration Area for a user equipment, where a Registration Area defines an area within which the user equipment is expected to be contactable for paging. For example, in 5G, an AMF in the 5G core network may also newly consider slices that are in a slice remapping list as equivalent when building a Registration Area for a user equipment. Therefore an AMF may newly accept to build registration area for UEs which includes nodes and TAs not supporting the same set of slices provided that these different sets are "equivalent".

In more detail, a Tracking Area (as defined in 3GPP TS 23.501) can be newly defined by an operator that comprises cells and radio access network access point s supporting different slices as long as any slice not supported in the full Tracking Area can be remapped according to its slice remapping list to a slice which is supported homogenously across the full Tracking Area. A Registration Area may comprise several Tracking Areas. A Tracking Area or the like that comprises multiple radio access network access points that support different slices may be called non-homogeneous slice Tracking Area.

When applied to a registration area such as a Registration Area described in TS 23.501, a Registration Area can be defined by an AMF in a network, and further be assigned to a user equipment comprising Tracking Areas and to Radio access network access point s supporting non homogeneous slice support provided that any slice not supported in the full Registration Area may be remapped (according to its slice remapping list) to a slice which is supported homogenously across the full Registration Area.

Therefore, with respect to the operations of the AMF in a 5G core network, the AMF node is aware of the slice remapping list, with the list being made accessible to the AMF by at least one of an operations and management entity or by a radio access network access point itself during a set-up procedure. The AMF may use this list during registration of a user equipment to define a non-homogenous slice compatible Registration Area as defined above to be allocated to that user equipment.

For example, assume that a first tracking area, TA1, supports slices 10, 11, 12 while a second tracking area, TA2, supports slices 11, 12 and a third tracking area, TA3, supports slice 12. In this case, a user equipment can be allocated a Registration Area comprising TA1, TA2, and TA3 by the AMF. This is because slice 10, which is supported in TA1 but which is unsupported in TA2 and TA3, can be remapped to slice 12, which is supported in the whole Registration Area. Similarly, slice 11, which is supported in TA1 and TA2, but not in TA3, can be remapped to slice 12, which is supported in the whole Registration Area.

The access and mobility information may also use this information to define an "Allowed" NSSAI, which comprises slices 10, 11, and 12.

We now consider the SMF. The SMF may be configured to be aware of the slice remapping feature. For example, the SMF may be configured such that whenever the SMF is notified of a change in slice for a given PDU session, the SMF may report this to a PCF and/or to a Charging Function in the core network. The SMF may send a report towards the user equipment that informs the user equipment about the change in slice. The report to the user equipment may be sent at a non-access stratum level. The SMF may be provided with slice information from the access network node in any of a plurality of different ways. For example, the slice information may be provided as part of an acceptance sent in response to a PDU session setup Resource Request. The slice information may be provided as a notification of autonomous slice upgrade/downgrade in radio access network via, for example, PDU SESSION RESOURCE NOTIFY request, a Path switch request during Xn handovers, and as a handover request acknowledge during NG handover.

Other than the above-mentioned cases, the core network operation may be unaffected by the presently described operations.

The following describes potential actions of a radio access network apparatus.

In the present disclosure, radio access network apparatuses are configured with a slice remapping table, as described above. For clarity, the examples below will also consider the case of slice 10 (capable of providing a higher service) remapping to slices 11 and 12 (capable of providing a lower service than slice 10).

A radio access network access point may be able to use the presently described techniques for several purposes, including PDU session establishment, PDU session upgrades, and for handover purposes.

We first consider the case of PDU session establishment.

In this case, if a radio access network access point supports only slice 11, and receives a PDU session request for slice 10, the radio access network access point will accept the request and serve the PDU session with slice 11. The radio access network access point will subsequently inform the core network that it accepted the request using slice 11. The radio access network access point then keeps, in the PDU session context, information on both the currently served slice (slice 11) and on target slice (slice 10) (i.e. as requested by the 5GC in PDU Session resource request). This radio access network access point will signal both the served slice and the target slice if it triggers a handover to another radio access network node, or if it triggers Dual Connectivity offload of the PDU session to another radio access network, where dual connectivity is defined in 3GPP S 38.300.

We second consider the case of PDU session upgrades.

The radio access network access point may also be able to upgrade its provided service to a requested slice. For example, we assume the case of a radio access network access point running a PDU session with served slice 11 and target slice 10. In this case, if the radio access network access point becomes able to support slice 10, the radio access network access point may switch the PDU session to slice 10 and notify the 5GC through an NGAP PDU SESSION RESOURCE NOTIFY message or equivalent that it now supports the said PDU session with slice 10. The radio access network access point may suddenly be able to support slice 10 if it has been upgraded, and/or if the radio access network conditions improve.

We third consider the case of handovers.

In this example, a source radio access network access point may signal information on the PDU session with served slice and target slice to target radio access network access point.

If a target radio access network access point receives a handover request for a PDU session having a target slice 10 but supports only slice 11, the target radio access network access point will accept the handover with the remapped slice 11 and store that the target slice is slice 10. This may be stored for any subsequent mobility (e.g. for future handover purposes), in addition for potential PDU upgrades purposes, as described above. If the received served slice is different to slice 11, the target radio access network access point will report the selected slice 11 to the core network. Using terminology from current communication specifications, this information may be included in either a Path Switch Request for base station handover or in a Handover Request Acknowledge for Next Generation handover procedures.

When a target radio access network access point receives a handover request for PDU session of target slice 10 and it supports slice 10, it will accept the handover with slice 10 and store that the target slice is slice 10. This may be stored for any subsequent mobility (e.g. for future handover purposes), in addition for potential PDU upgrades purposes, as described above. If the received served slice is different to slice 10, the target radio access network access point will report the selected slice 10 to the core network. Using terminology from current communication specifications, this information may be included in either a Path Switch Request for base station handover or in a Handover Request Acknowledge for Next Generation handover procedures.

When a target radio access network access point receives a handover request for a PDU session of target slice 11 and it supports slices 10 and 11 or only slice 11, the target radio access network access point will accept the handover with slice 11 and store that the target slice is slice 11. This may be stored for any subsequent mobility (e.g. for future handover purposes), in addition for potential PDU upgrades purposes, as described above. If the received served slice is different than slice 11, the target radio access network access point will report the selected slice 11 to the core network. Using terminology from current communication specifications, this information may be included in either a Path Switch Request for base station handover or in a Handover Request Acknowledge for Next Generation handover procedures.

The following will discuss example signalling between different communication elements. These example signalling procedures are discussed in relation to FIGS. 4 and 5 and, as per the above-described examples, all of the interacting radio access network access point s are aware of the slice remapping table in the radio access network. Further, in the example below, slice 10 remaps to slice 11 and 12, while slice 13 corresponds to a totally different set of slices. The presently described AMF in the core network is aware of the slice remapping table. This is so that the AMF can allocate Registration Areas and/or tracking areas to the user equipment, as described in the above.

Figure 4:
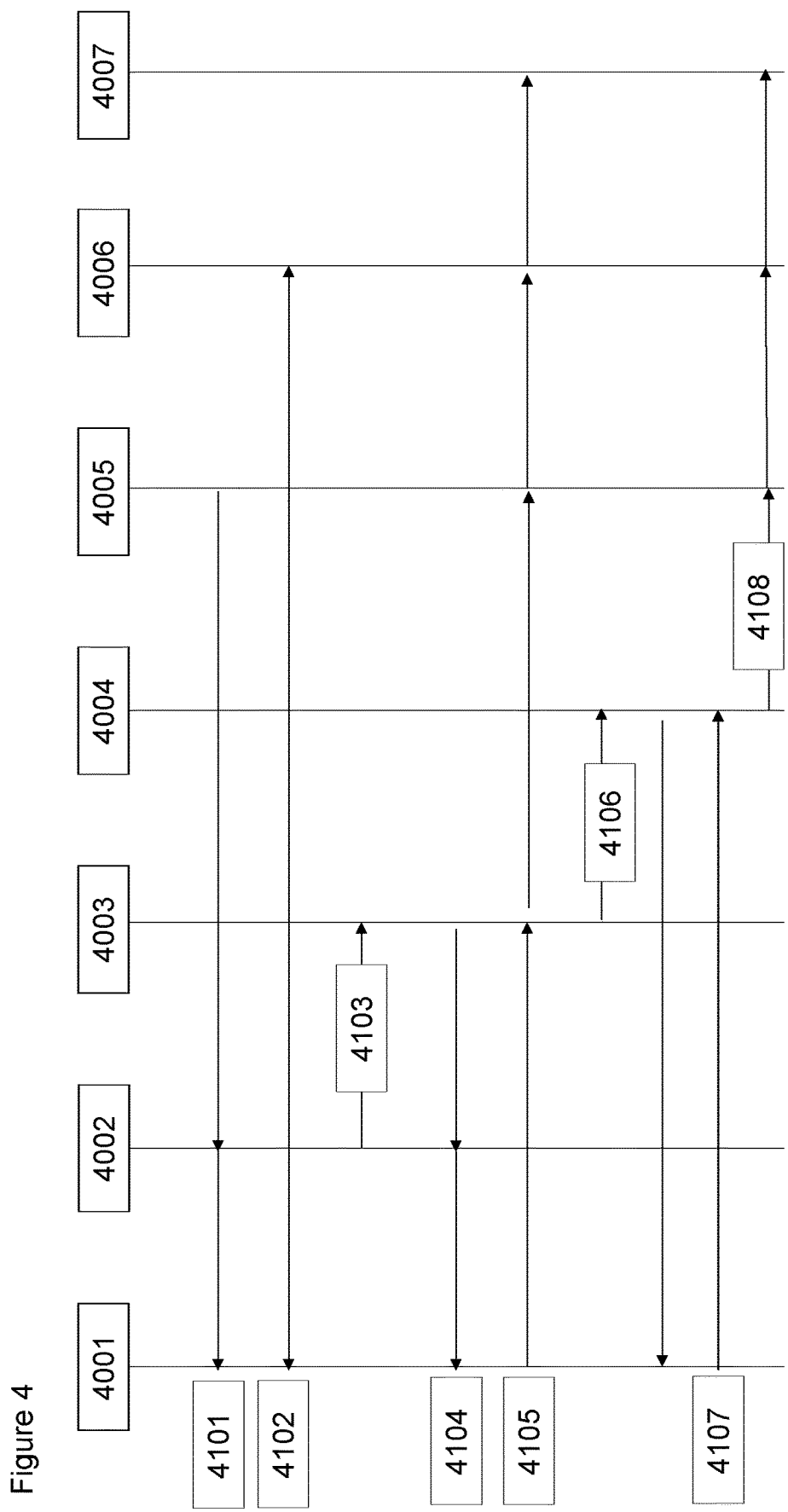
FIGS. 4 and 5 show signalling diagrams illustrating example signals between communicating entities.

FIG. 4 shows signalling between a user equipment 4001, a source radio access network access point 4002, a first target radio access network access point 4003, a second target radio access network access point 4004, an AMF 4005, a SMF 4006 and a PCF (and/or a CHF) 4007. The radio access network access point 4002 may support slices 10, 11, and 12. The radio access network access point 4003 may support slices 11, and 12. The radio access network access point 4004 may support slices 10, 11, and 12.

At 4101, the user equipment is configured to receive a service provided via radio access network access point 4002. Radio access network access point 4002 supports slices 10, 11, 12. The user equipment has been assigned an Allowed NSSAI=slices 10, 11, 12 for the Registration Area in a previous message from the core network. The previous message may have been transmitted by AMF 4005 as part of a non-access stratum message. The previous message may have been, for example, a registration accept message, user equipment Configuration Update message, etc.

At 4102, the user equipment sets up a PDU session of slice 10 with radio access network access point 4002.

At 4103, the radio access network access point 4002 determines to trigger handover of the user equipment 4001 to radio access network access point 4003. Radio access network access point 4002 sends a handover request to radio access network access point 4003. The handover request comprises an indication that a target slice for the indicated service is slice 10, and that the served slice is slice 10.

At 4104, the radio access network access point 4003 determines that it does not support slice 10 and accepts the PDU session at handover with slice 11. The radio access network access point 4003 sends a handover command to the user equipment.

At 4105, radio access network access point 4003 notifies the core network in a path switch request that the handover succeeded for the PDU session, but with a change of served slice from slice 10 to slice 11. The SMF 4006 may receive this information and may notify the PCF 4007 and/or a CHF (not shown) with this information.

At 4106, radio access network access point 4003 triggers handover to radio access network access point 4004 by sending a handover message that indicates a target slice of slice 10 and a currently served slice of slice 11.

At 4107, radio access network access point 4004 accepts the PDU session at handover with a served slice of slice 10. The radio access network access point 4004 sends a handover command to the user equipment 4001.

At 4108, after receiving handover complete message from the user equipment 4001, the radio access network access point 4004 notifies the core network in a path switch request that the handover succeeded for the PDU session, but with a change of served slice from slice 11 to slice 10. The SMF 4006 may receive this information and may notify the PCF 4007 and/or a CHF (not shown) with this information.

The signalling diagram described in relation to FIG. 4 represents potential steps that may be performed for a handover between radio access network access point s using an interface between them, such as the Xn interface. The equivalent steps used for a handover performed using the NG/N2 interface(s) are similar to those shown in FIG. 4. However, the main difference is that the change of supported slice for the PDU session is indicated to the core network by the radio access network access point s 4003 and 4004 may be provided in a handover request acknowledge message or in a handover notify message during the handover signalling instead of the path switch request message (steps 4103, 4104, 4105 and 4106, 4107, and 4108 above).

Figure 5:
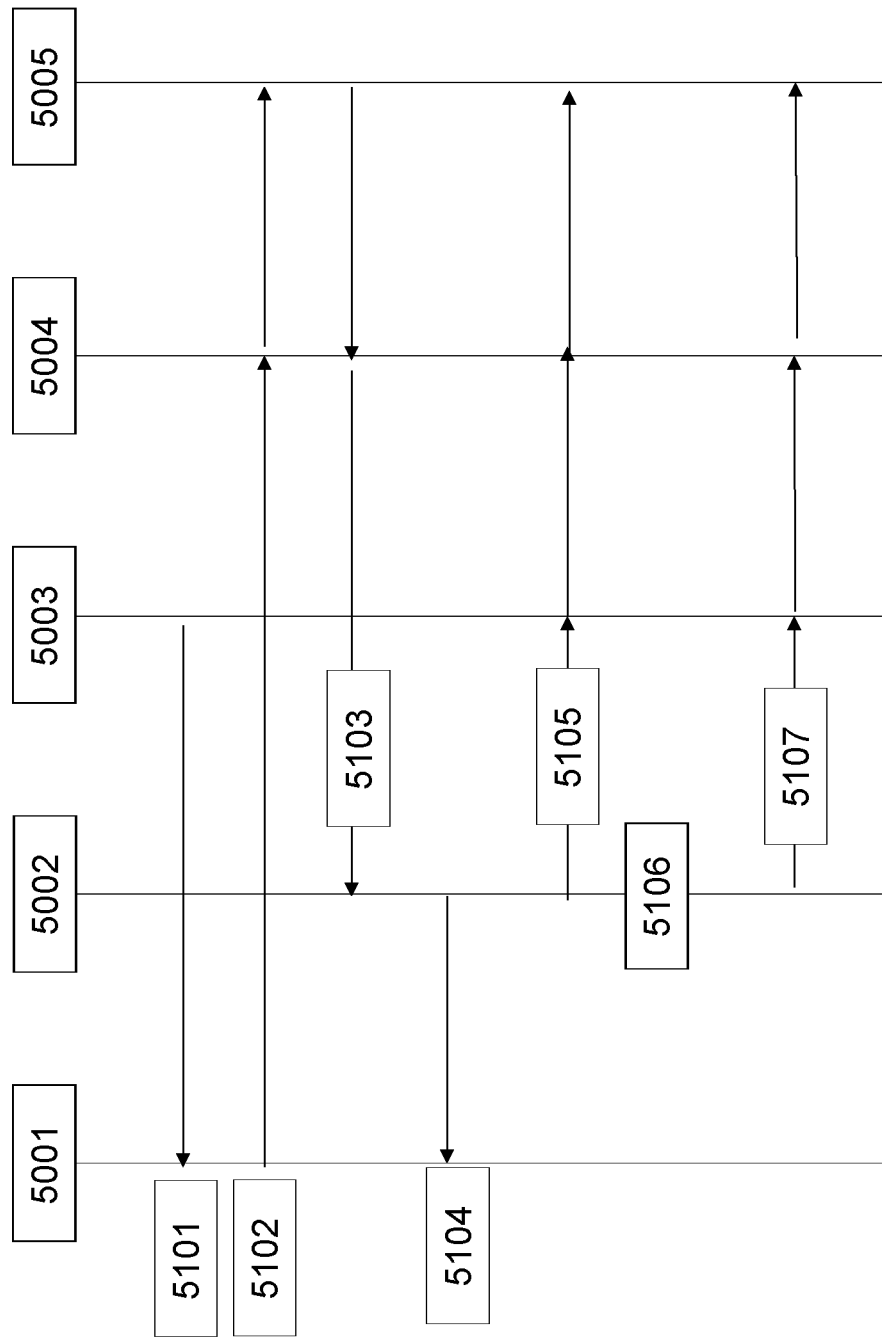

Another signalling diagram is presented in FIG. 5, and relates to signalling that may be performed when the slice provided by an individual radio access network access point changes during provision of a service/PDU session.

FIG. 5 shows a user equipment 5001, a radio access network access point 5002, an AMF 5003, a SMF 5004, and a PCF (and/or a CHF) 5005. The radio access network access point 5002 initially supports slices 11, 12.

At 5101, the user equipment 5001 receives an assignment indicating that its allowed NSSAI (allowed slices) comprises slices 10, 11, 12, for the Registration Area. This assignment may be received in a non-access stratum message. For example, this assignment may be received in, for example, a registration accept message, a user equipment Configuration Update message, etc.). This assignment may be received regardless of whether or not the user equipment 5001 is currently served by radio access network access point 5002 which does not support slice 10.

At 5102, the user equipment 5001 sends a request to the core network to setup a PDU session of slice 10. The user equipment 5001 may be unaware that current serving radio access network access point 5002 doesn't support slice 10. This request maybe received by AMF 5003 and forwarded to the SMF 5004.

At 5103, the SMF 5004 may transmit a request to the radio access network access point 5002 for a PDU session of slice 10 possibly including a NAS a PDU session establishment accept message. The Session Management Function 5004 may be unaware that the current serving radio access network access point 5002 doesn't support slice 10.

At 5104, the radio access network access point 5002 consults its remapping table, and accepts the PDU session with slice 11. The radio access network access point 5002 accepts the PDU session by 1) if received from the SMF, transmitting a non-access stratum PDU session establishment accept message to the user equipment 5001 and by 2) answering positively to the SMF indicating that slice 11 will provide the PDU session instead of slice 10. The user equipment 5001 may be unaware that slice 11 will provide the PDU session instead of slice 10. This makes the user equipment transparent and no need to be upgraded for this invention.

At 5105, the radio access network access point 5002 responds to the core network's PDU session setup request message. This response may be passed to the SMF 5004 after initially being received by the AMF 5003. This response may notify the core network that the PDU session was accepted but will be served with slice 11. The SMF 5004 may further inform the PCF (and/or the CHF) 5005 about the slice being used to serve the PDU session.

After the session has been setup, the radio access network access point 5002 may be upgraded such that radio access network access point 5002 newly supports slice 10. This is shown as an extension to the above-mentioned signalling of FIG. 5, although it is understood that it is not dependent on exactly how a slice session is initiated in the first place. In other words, it may be performed independently of the signalling described in relation to 5101 to 5105.

At 5106, the radio access network access point 5002 currently serving a PDU session 1 having a target slice of slice 10 and a currently served slice of slice 11 becomes able to provide slice 10. As described above, this may be because of new processing capacity, a change in the operations and management function, etc.

At 5107, the radio access network access point 5002 notifies the SMF 5004 that the PDU session has been changed from slice 11 into slice 10. This notification may be performed using a NGAP PDU SESSION RESOURCE NOTIFY message, or an alternate message defined by the operating communication protocol. The SMF 5004 may inform the policy charge function (and/or the charge function) 5006 of this change in serving slice. The user equipment is not informed of that change.

FIGS. 6 to 11 are flow charts illustrating potential operations by various network entities described herein.

Figure 6:
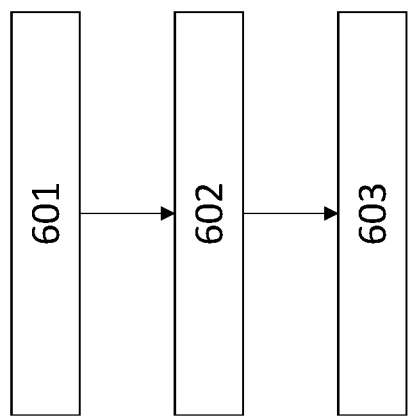
FIGS. 6 to 11 are flow charts illustrating potential operations by various network elements.

FIG. 6 is a flow chart illustrating potential actions by a network apparatus, such as a radio access network apparatus.

At 601, the apparatus stores a mapping. The mapping may comprise an indication of a first virtual network and at least one other virtual network configured to provide a service at a lower quality than the first virtual network. The lower quality may be a lower quality wholly within a radio access network part of the network.

At 602, the apparatus receives, from another network apparatus, a request to provide a service using the first virtual network. The another network apparatus may comprise means for operating as a radio access network access point. The another network apparatus may comprise means for operating as an access and mobility function. The request may be a handover request. The handover request may be received directly from a radio access network apparatus that is currently providing the service. The handover request may be received indirectly from a radio access network apparatus that is currently providing the service. The handover request may be received from a core network apparatus, such as from an access and mobility function. The request may comprise a protocol data unit session setup request message and/or an Initial Context Setup Request message. The request may further comprise an indication of a second virtual network that is currently used to provide said service.

The request may further indicate a virtual network that is currently used to provide the service.

At 603, the apparatus may use the mapping and the indication of the first virtual network to select a virtual network to provide the requested service. The using may comprise selecting a virtual network that corresponds to the highest level of service provision provided by the network apparatus within said mapping.

The network apparatus may transmit to a core network processing function an indication of the selected virtual network. The indication of the selected virtual network may be transmitted via at least one of a protocol data unit SESSION RESOURCE NOTIFY request, a PDU session Resource Response, an Initial Context Setup Response, a Handover Notify, a Path switch request, and/or a handover request acknowledge.

The network apparatus may further operate as a radio access network access point.

A virtual network may correspond to a network slice.

Figure 7:
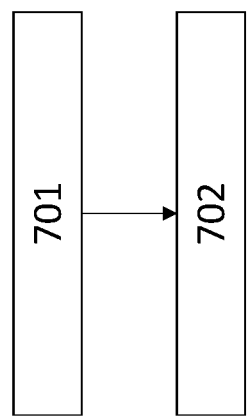

FIG. 7 shows potential operations of a network apparatus. This network apparatus may be a radio access network apparatus. This network apparatus may be a source apparatus.

At 701, the apparatus stores a mapping. The mapping may comprise an indication of a first virtual network and at least one other virtual network configured to provide a service at a lower quality than the first virtual network.

At 702, the apparatus transmits, to another network apparatus, a request to provide a service using a first virtual network.

The network apparatus may operate as a radio access network access point.

The request may further comprise an indication of a second virtual network that is currently used by the transmitting network apparatus to provide said service.

The lower quality may be a lower quality wholly within a radio access network part of the network.

The request may further comprise an indication of a virtual network that is currently used to provide the service.

The request may be a handover request.

The request may comprise a protocol data unit session setup request message and/or an Initial Context Setup Request message.

A virtual network may correspond to a network slice.

Figure 8:
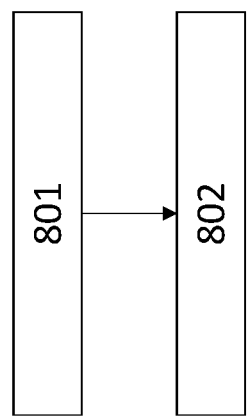

FIG. 8 is a flow chart illustrating potential operations of a core network apparatus. The core network apparatus may be configured to function as at least part of an access and mobility function and/or as at least part of a session and mobility function.

At 801, the apparatus receives, from another network apparatus, an indication that the another network apparatus will provide a service using a second virtual network and an indication that the service is preferably provided using a first virtual network.

At 802, the apparatus provides the received indication to a network apparatus comprising means for operating as a core network processing function.

The request may be a handover request.

The request may comprise a protocol data unit session setup request message and/or an Initial Context Setup Request message.

A virtual network may correspond to a network slice.

The core network apparatus may further comprise means for transmitting, prior to receiving the indication, to a radio access network apparatus, a request to provide the service using the first virtual network.

Figure 9:
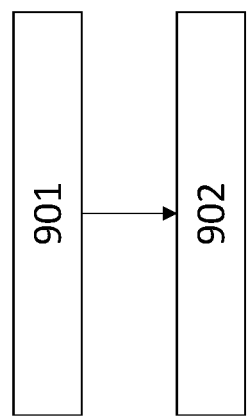

FIG. 9 is a flow chart showing potential operations of a core network apparatus. The core network apparatus may be configured to operate at least in part as a policy control function.

At 901, the core network apparatus receives an indication that a service is delivered using a second virtual network while the service should be preferably provided using a first virtual network.

At 902, the core network apparatus determines and transfers new policies to deliver the service A virtual network may correspond to a network slice.

Figure 10:
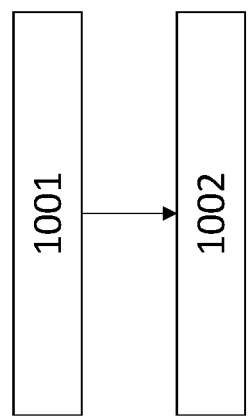

FIG. 10 shows a flow chart of potential operations that may be performed by a core network apparatus. The core network apparatus may be configured to operate at least in part as a charging function.

At 1001, the core network apparatus may receive an indication that a service is delivered using a second virtual network while the service should be preferably provided using a first virtual network.

At 1002, the core network apparatus may store the information for generating charging information.

The information may be stored in a Charging Record.

A virtual network may correspond to a network slice.

Figure 11:
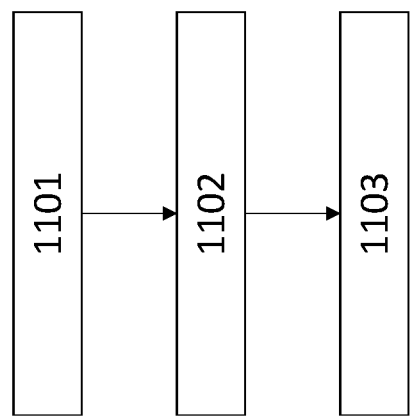

FIG. 11 illustrates potential operations that may be performed by a core network apparatus. The core network apparatus may be configured to operate, at least in part, as an access and mobility function.

At 1101, the core network apparatus stores a mapping. The mapping may comprise an indication of a first virtual network and at least one other virtual network configured to provide a service at a lower quality than the first virtual network.

At 1102, the core network apparatus determines at least two network apparatuses supporting different sets of virtual networks, wherein each set comprises at least one virtual network indicated within said mapping.

At 1103, the core network apparatus uses the mapping and the determined at least two network apparatuses to define an area within which a terminal receiving the service is likely to be found. The defined area may be a Registration Area. The defined area may be a Tracking Area.

A virtual network may correspond to a network slice.

It should be understood that each block of the flowchart of the Figures and any combination thereof may be implemented by various means or their combinations, such as hardware, software, firmware, one or more processors and/or circuitry.

It is noted that whilst examples have been described in relation to one example of a standalone 5G, similar principles may be applied in relation to other examples of standalone 3G, LTE or 5G networks. It should be noted that other examples may be based on other cellular technology other than LTE, NR or on variants of both. Therefore, although certain examples were described above by way of example with reference to certain example architectures for wireless networks, technologies and standards, examples may be applied to any other suitable forms of communication systems than those illustrated and described herein.

It is also noted herein that while the above describes examples, there are several variations and modifications which may be made to the disclosed solution without departing from the scope of the present claims.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various examples may be implemented in hardware or special purpose circuits, software, logic or any combination thereof. Some aspects of the described may be implemented in hardware, while other aspects may be implemented in firmware or software which may be executed by a controller, microprocessor or other computing device, although the claimed is not limited thereto. While various aspects of the claimed may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out examples. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the above disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary example of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the appended claims.

The invention claimed is:

1. A network apparatus, comprising:
at least one processor; and
at least one memory storing computer code that, when executed by the at least one processor, causes the network apparatus to:
store a mapping, the mapping comprising an indication of a first virtual network being remapped to at least one other virtual network configured to provide a service at a lower quality than the first virtual network;
receive, from another network apparatus, a request to provide a service using the first virtual network; and
use the mapping and the indication of the first virtual network to select a virtual network to provide the requested service.

2. The network apparatus as claimed in claim 1, wherein the another network apparatus is configured to operate as a core network processing function.

3. The network apparatus as claimed in claim 1, wherein the another network apparatus is configured to operate as a radio access network access point.

4. The network apparatus as claimed in claim 1, wherein the at least one memory further and computer code is further configured, with the at least one processor, to cause the network apparatus to:
transmit, to a core network processing function, an indication of the selected virtual network.

5. The network apparatus as claimed in claim 4, wherein the indication of the selected virtual network is transmitted via at least one of:
a protocol data unit SESSION RESOURCE NOTIFY request,
a Protocol Data Unit session Resource Response,
an Initial Context Setup Response,
a Handover Notify,
a Path switch request, or
a handover request acknowledge.

6. The network apparatus as claimed in claim 1, wherein the at least one memory and computer code is further configured, with the at least one processor, to cause the network apparatus to:
select a virtual network that corresponds to the highest level of service provision provided by the network apparatus within said mapping.

7. The network apparatus as claimed in claim 1, wherein the network apparatus is configured to operate as a radio access network access point.

8. The network apparatus as claimed in claim 1, wherein the request comprises a handover request.

9. The network apparatus as claimed in claim 1, wherein the request comprises at least one of:
a protocol data unit session setup request message, or
an Initial Context Setup Request message.

10. The network apparatus as claimed in claim 1, wherein each virtual network among the first virtual network and the at least one other virtual network respectively corresponds to a different network slice.

11. A network apparatus, comprising:
at least one processor; and
at least one memory storing computer code that, when executed by the at least one processor, causes the network apparatus to:

store a mapping, the mapping comprising an indication of a first virtual network being remapped to at least one other virtual network configured to provide a service at a lower quality than the first virtual network; and transmit, to another network apparatus, a request to provide a service using a first virtual network.

12. The network apparatus as claimed in claim 11, wherein the network apparatus is configured to operate as a radio access network access point.

13. The network apparatus as claimed in claim 11, wherein the request further comprises an indication of a second virtual network that is used, at the time of the request, by a transmitting network apparatus to provide the service.

14. The network apparatus as claimed in claim 11, wherein the lower quality is a lower quality within a radio access network part of a network comprising the network apparatus.

15. The network apparatus as claimed in claim 11, wherein the request further comprises an indication of a virtual network that is used, at the time of the request, to provide the service.

16. A core network apparatus, comprising:
at least one processor; and
at least one memory storing computer code that, when executed by the at least one processor, causes the core network apparatus to:
receive, from another network apparatus, an indication that the another network apparatus will provide a service using a second virtual network, and an indication that the service is preferably provided using a first virtual network; and
provide the received indication to a network apparatus configured to operate as a core network processing function.

17. The core network apparatus as claimed in claim 16, wherein the at least one memory further and computer code are further configured, the at least one processor, to cause the core network apparatus to:
transmit, prior to receiving the indication, to a radio access network apparatus, a request to provide the service using the first virtual network.

18. The core network apparatus as claimed in claim 17, wherein the request comprises a handover request.

19. The core network apparatus as claimed in claim 17, wherein the request comprises at least one of a protocol data unit session setup request message or an Initial Context Setup Request message.

20. The core network apparatus as claimed in claim 16, wherein the first virtual network corresponds to a first network slice, and
the second virtual network corresponds to a second network slice that is different from the first network slice.

* * * * *